United States Patent
Chopra et al.

(10) Patent No.: US 11,308,703 B2
(45) Date of Patent: *Apr. 19, 2022

(54) AUGMENTED REALITY CHANNEL SOUNDING SYSTEM

(71) Applicant: AT&T Intellectual Property I, L.P., Atlanta, GA (US)

(72) Inventors: Aditya Chopra, Austin, TX (US); Andrew Thornburg, Austin, TX (US); Arunabha Ghosh, Austin, TX (US); Saeed Ghassemzadeh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,911

(22) Filed: Nov. 30, 2020

(65) Prior Publication Data
US 2021/0082201 A1 Mar. 18, 2021

Related U.S. Application Data

(63) Continuation of application No. 16/527,638, filed on Jul. 31, 2019, now Pat. No. 10,885,717.

(51) Int. Cl.
*G06T 19/00* (2011.01)
*H04B 17/391* (2015.01)
*H04B 17/309* (2015.01)

(52) U.S. Cl.
CPC ......... *G06T 19/006* (2013.01); *H04B 17/309* (2015.01); *H04B 17/391* (2015.01)

(58) Field of Classification Search
None
See application file for complete search history.

(56) References Cited

U.S. PATENT DOCUMENTS

2019/0347368 A1* 11/2019 Duff ...................... G06T 19/006

OTHER PUBLICATIONS

WiFi AR. (Jan. 25, 2019). YouTube. https://www.youtube.com/watch?v=eN-ams4Avyw (Year: 2019).*
Architecture of radio. (Aug. 25, 2015). YouTube. https://www.youtube.com/watch?v=wYBg_y1-bdw (Year: 2015).*
Lien, B. (Feb. 13, 2019). Using Augmented Reality to visualize signal strength data. Medium. https://medium.com/badvr/using-augmented-reality-to-visualize-signal-strength-data-200999d036da (Year: 2019).*

(Continued)

*Primary Examiner* — Vu Nguyen (57) ABSTRACT

Methods, computer-readable media, and apparatuses for presenting a visualization of at least one wireless channel parameter as an overlay on top of an image of an environment are described. For example, a processing system including at least one processor may obtain at least a first wireless channel parameter of at least a first location, generate a first visualization of the at least the first wireless channel parameter, where the first visualization indicates at least one of: a magnitude of the at least the first wireless channel parameter or a direction of the at least the first wireless channel parameter, and present the first visualization of the at least the first wireless channel parameter as an overlay on top of a first image of an environment associated with the first location via a display device.

20 Claims, 5 Drawing Sheets

(56) References Cited

OTHER PUBLICATIONS

D'Orazio, D. (Nov. 28, 2015). See the invisible wireless signals around you with this augmented reality app. The Verge. https://www.theverge.com/2015/11/28/9811910/augmented-reality-app-lets-you-see-wireless-signals (Year: 2015).*

Wi-Fi Solutions, 2019, Wi-Fi AR, [video] Available at : ,https://www.youtube.com/watch?v-eN-ams4Avyw. [Accessed May 22, 2020], (Year:2019).

AR Critic, 2019, WiFi Signal Strength Meter Mapping AR Apps for Androind, [video] Available at: ,https://www/youtube.com/watch?v=j2rKAMDi@_c. [Accessed May 22, 2020], (Year: 2019).

D'Oazio, D., (Nov. 28, 2015), See the invisible wireless signals around you with the augmented reality&nbso;app., Retrieved May 22, 2020, from https://theverge.com/2015/11/28/98119/augmented-reality-app-lets-you-see-wireless-signals (Year: 2015).

U.S. Appl. No. 16/527,638, filed Jul. 31, 2019.

* cited by examiner

AUGMENTED REALITY CHANNEL SOUNDING SYSTEM

This application is a continuation of U.S. patent application Ser. No. 16/527,638, filed Jul. 31, 2019, which is herein incorporated by reference in its entirety.

The present disclosure relates generally to wireless communication networks, and more particularly to methods, non-transitory computer readable media, and apparatuses for presenting a visualization of at least one wireless channel parameter as an overlay on top of an image of an environment.

BACKGROUND

A wireless channel sounder is a device for measuring wireless channel related parameters such as complex impulse response, path loss, received signal strength (RSS), excess delay, or root-mean-square (RMS) delay spread, Doppler spread, fade rate, angle of arrival (AoA) and/or angle of departure (AoD), and the like, as experienced by a user equipment or base station. While these measurements are valuable to generate statistical models of the wireless channel, a single measurement does not on its own provide much value.

SUMMARY

In one example, the present disclosure discloses a method, computer-readable medium, and apparatus for presenting a visualization of at least one wireless channel parameter as an overlay on top of an image of an environment. For example, a processing system including at least one processor may obtain at least a first wireless channel parameter of at least a first location, generate a first visualization of at least the first wireless channel parameter, where the first visualization indicates at least one of a magnitude of the first wireless channel parameter or a direction of the first wireless channel parameter, and present the first visualization of at least the first wireless channel parameter as an overlay on top of a first image of an environment associated with the first location via a display device.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and apparatuses for presenting a visualization of at least one wireless channel parameter as an overlay on top of an image of an environment. Developing 3GPP Fifth Generation (5G) standards include the use of millimeter wave frequencies (30 GHz to 300 GHz) as carrier frequencies. The propagation loss of air at such frequencies is relatively high. One technique to overcome this loss is the use of beamformed wireless communication. In beamformed communications, wireless signals are transmitted in a narrow beam. The concentration of energy in a narrow beam helps overcome the propagation loss of the wireless medium. Similarly, 5G receivers may also sense wireless signals in a narrow region of space, allowing the capture of a large amount of signal energy and correspondingly low amounts of noise and interference energy. This is relevant to channel sounding, as 5G channel models should provide metrics with respect to a spatial grid around the transmitter or the receiver. Although examples of the present disclosure are applicable to a wide range of frequency bands, in one example, the present disclosure may relate to channel sounding in centimeter and millimeter wave ranges. For instance, for all of the examples herein, the considered wireless cellular communications standard may be the Third Generation Project (3GPP) New Radio (NR) and/or 5G radio access technology.

For deployment and configuration of wireless network infrastructure, it is beneficial to obtain a wireless channel's propagation within the frequency bands of interest to the standard. The act of making such wireless channel propagation measurements is known as channel sounding. Channel sounding typically operates by transmitting a known wireless signal in the frequency band of interest by a channel sounding transmitter, and subsequently receiving this signal at a different location by a channel sounding receiver. Knowing both the transmitted and the received signal, the state of the channel at the time of transmission can be extracted, resulting in what may be referred to as a "channel snapshot." Multiple such channel snapshots can be acquired by varying the hardware location, orientation, speed, time of transmission, and even the environment around the channel sounder transmitter and the channel sounding receiver. While these measurements are valuable to generate statistical models of the wireless channel, a single measurement does not on its own provide much value. Thus, the resulting dataset of channel snapshots may be subsequently analyzed to extract channel models to be used for standards development, as well as for network infrastructure deployment, configuration, and optimization.

Examples of the present disclosure provide for visualizations of channel sounding information (broadly "channel sounding measurements" or "wireless channel properties") via augmented reality (AR) devices. As referred to herein AR devices may include AR headsets, which may project visual information within the field of view of a user (e.g., wireless channel properties), and which may be perceived by the user simultaneously with imagery of the environment. AR devices may also include devices which may capture imagery of an environment, project additional visual information (e.g., wireless channel properties) over the imagery of the environment, and present the combined imagery of the environment and the wireless channel properties via a display screen. In addition AR devices may include virtual reality (VR) devices, which may provide for a display of imagery of an environment overlaid with additional visual information (e.g., wireless channel properties), where the display via the VR device may occur at a location that is not the same as the location(s) from which the wireless channel properties are measured.

In one example, directions of arrival and/or departure may be overlaid over imagery of the environment and may allow a user, such as network technician, to identify locations of interest. This can be performed in post-processing (e.g., after the channel sounding, or measurement of the wireless channel parameters at multiple locations over a period of time) or in real-time (e.g., providing an AR view of the wireless channel as the wireless channel parameters are measured, or as close as possible to the time of the measurement of the wireless channel parameters, allowing for device capabilities, network latency, etc.). For example, a technician may wear AR glasses and "see" the wireless channel from the perspective of a channel sounder receiver, which may comprise a mobile device (e.g., a smartphone or user equipment (UE)) configured for wireless channel sounding, or a dedicated channel sounding receiver. In one example, an AR device for presenting visualizations of wireless channel parameters may also comprise the channel sounding receiver for obtaining the wireless channel parameters. In another example, an AR device for presenting visualizations of wireless channel parameters may be a separate device from one or more channel sounding receivers that are used for channel sounding in the environment (obtaining/measuring the wireless channel parameters). Examples of the present disclosure therefore enhance the value of individual sounding channel snapshots. Through visualizations, the locations in the environment where the beams are reflecting and impinging upon the receiver may be identified. In addition, in one example a technician may modify the environment and see in real-time or in near real-time the impact of the changes on the wireless channel.

In one example, based on multiple antennas at both transmitters and receivers, a M×N (M transmit antennas and N receive antennas) multiple input multiple output (MIMO) channel sounding system (comprising at least one channel sounding transmitter and at least one channel sounding receiver) is able to measure directional channel propagation at both ends of the wireless link (e.g., at the transmit and receive antennas) and improve resolution of the spatial multiple path parameters. In one example, a channel sounding system may transmit a known signal (broadly a "channel sounding signal" or "channel sounding waveform") via a first transmit beam direction of a channel sounding transmitter, and measure the channel parameters via all N receive antennas at a channel sounding receiver. The channel sounding transmitter may then switch to a second transmit beam direction and the process repeats until all M×N combinations have been performed.

In one example, the channel sounding receiver may be provided with information regarding the channel sounding waveform(s) in advance of transmission by the channel sounding transmitter. This may comprise an out-of-band wireless link, a cable connection between the transmitter and receiver, and so forth. Information regarding the at least one channel sounding waveform may include a transmit beam identifier, one or more modulation parameters of the at least one channel sounding waveform, and so forth. By way of example and without any limitation, a Zadoff-Chu (ZC) sequence in the time domain may be used for channel sounding. In another example, in the case of frequency domain processing, the sounding signal may be inserted before an inverse Fast Fourier Transform (iFFT) stage in the transmitter. Thus, parameters may include an identification of a modulation coding scheme e.g., a binary phase shift keying (BPSK) modulation coding scheme, a quadrature phase shift keying (QPSK) modulation coding scheme, a frequency modulation (FM) scheme, an amplitude modulation (AM) scheme, a frequency shift keying (FSK) scheme, a modulation coding scheme based upon a precoding matrix indicator, or a modulation coding scheme based upon precoder cycling. Higher level encoding schemes such as 16-QAM, 64-QAM, and the like may also be used in other examples.

From the received channel sounding waveforms, a channel sounding receiver may capture measurements of wireless channel parameters (e.g., one or more "key performance indicators" (KPIs)), such as a complex impulse response, a path loss, a received signal strength (RSS), e.g., a reference signal received power (RSRP), a carrier-to-interference (CIR) ratio (or signal-to-noise ratio (SNR)), an excess delay, a root-mean-square (RMS) delay spread, an angular spread, a Doppler spread, a fade rate, an angle of arrival (AoA), or the like, along with spatial orientation information, such as azimuth and elevation angles, and locations associated with the measurements.

In accordance with the present disclosure, a channel sounding receiver may tag a wireless channel parameter measurement with directional/spatial orientation information, i.e., in addition to a location. In one example, the channel sounding receiver may calculate a direction, or spatial orientation of a receive beam with respect to a local coordinate system, e.g., a three dimensional space with dimensions/axis aligned to a length, a width, and a depth of the receiver device, for example. In yet another example, the channel sounding receiver may associate the angle of arrival (AoA) with a wireless channel parameter measurement (and a location), (e.g., where the wireless channel parameter measurement relates to a received power). In one example, the channel sounding receiver does not tag a wireless channel parameter measurement (e.g., received signal strength) with spatial orientation information, but rather tags spatial orientation information of a measurement with the location. For instance, at a given location, the primary direction from which the signal energy arrives is recorded, but not the actual received signal strength.

In one example, locations, or geographic positions may be determined at the channel sounding receiver device via a Global Positioning System (GPS) receiver, or may be derived using other location estimation methods, such as cell identifier (cell ID) based methods, observed time difference of arrival (OTDA) techniques, or barycentric triangulation. In this regard, it should be noted that any references herein to a channel sounding receiver may comprise a mobile channel sounding receiver, i.e., a device that is portable and which can be moved from location to location. For instance, a mobile channel sounding receiver may be moved with relative ease, such as one that may be carried by a person or wheeled on a small cart that may be pushed or pulled by a person. In addition, the orientation of the channel sounding receiver may be determined from a gyroscope and compass, allowing the channel sounding receiver device to determine a receive beam direction/spatial orientation, and to therefore measure wireless channel parameters with high spatial accuracy.

In one example, the channel sounding receiver may store one or more wireless channel parameter measurements in a record, along with the spatial orientation information and a location associated with the wireless channel parameter measurements, e.g., in a local memory. In one example, the channel sounding receiver may be deployed to obtain wireless channel parameter measurements at various locations within an environment and may collect and store all of the measurements. In one example, the channel sounding receiver may also capture imagery of an environment at one or more locations (e.g., still images/photos and/or video), which may similarly be stored in connection with the wireless channel parameter measurements from the respective locations. For instance, the channel sounding receiver may include a 360 degree camera, an omnidirectional camera, a plurality of cameras to capture imagery in different directions, etc. The imagery may be captured at the same times or at different times as the corresponding wireless channel parameters are measured by the channel sounding receiver. For example, the captured imagery of the environment may be used in examples where visualizations of the wireless channel are experienced through a VR device that may be remote from the environment in which the channel sounding takes place. It should be noted that in another example, imagery of the environment may be captured via a separate device, such as digital camera, or a device with an integrated digital camera, at a same time or at a different time from the channel sounding (the measuring of the wireless channel parameters). For instance, a separate 360 degree camera may be deployed to the locations from which the wireless channel parameters are measured, and 360 degree images or video (broadly "imagery") may be captured and stored by the camera.

In one example, the channel sounding receiver may retrieve one or more measurements (wireless channel parameters), generate one or more visualizations of one or more of the wireless channel parameters, and present the one or more visualizations as one or more overlays on top of image(s) of an environment that includes one or more locations associated with the one or more wireless channel parameters (e.g., via a display screen). For instance, in such an example the channel sounding receiver and AR device may comprise an integrated device with components for both functionalities. In another example, the channel sounding receiver may provide the channel sounding measurements to an AR device to generate and present the one or more visualizations. Alternatively, or in addition, the channel sounding receiver may generate the one or more visualizations and may provide the one or more visualizations to an AR device for presentation. In one example, the channel sounding receiver and/or another device may also provide imagery of the environment associated with one or more locations to the AR device for presentation in connection with the one or more visualizations. For instance, this may be performed when the AR device is a VR device that is remote from the environment in which the channel sounding takes place.

In another example, the measurements may be retrieved and transferred to another device or system, e.g., a network-based server, for storage and/or analysis. For instance, similar data from the mobile channel sounding transmitter regarding the transmit beam(s), the channel sounding waveforms, the location(s) of the mobile channel sounding transmitter, etc. may be uploaded to the same device or system and correlated with the measurements from the channel sounding receiver. In another example, the measurements from the channel sounding receiver may be transferred to the mobile channel sounding transmitter for storage and/or analysis. This can be done after obtaining a series of measurements, e.g., via a cable connection when the mobile channel sounding transmitter and receiver and together in a same location. However, in another example, all or a portion of the wireless channel parameter measurements may be transmitted wirelessly by the channel sounding receiver to the mobile channel sounding transmitter wirelessly via a network (e.g., via a cellular network, a non-cellular wireless network, and/or via a peer-to-peer wireless link). In one example, imagery of the environment associated with one or more locations in the environment may also be provided by the channel sounding receiver or another device to the channel sounding transmitter and/or to a server for storage, analysis, and so forth.

In one example, the wireless channel parameters (and in one example, imagery of the environment) may be retrieved by the server and provided to an AR device to generate one or more visualizations of one or more of the wireless channel parameters, and to present the one or more visualizations as one or more overlays on top of image(s) of an environment that includes one or more locations associated with the one or more wireless channel parameters.

In one example, a visualization may comprise one or more vectors representing one or more wireless channel parameters. For instance, vectors may be generated and presented such that the vectors appear to be pointing toward or away from a location of the AR device (e.g., at a current location in the physical environment, and/or from a perspective within a virtual environment comprising the imagery that is representative of the physical environment). For example, the wireless channel parameters may be represented as line segments having lengths and/or thicknesses which are representative of the magnitudes of the respective wireless channel parameters. In another example, each wireless channel parameter that is included in a visualization may be represented by a line segment having a color corresponding to the magnitude according to a designated color scale. In addition, each line segment, or vector, may have a direction that is indicative of an angle of arrival (AoA) (or angle of departure (AoD) for visualizations of the wireless channel from a transmitter perspective and/or with respect to an uplink from the perspective of a channel sounding receiver to a channel sounding transmitter).

In one example, a visualization may comprise one or more vectors representing one or more wireless channel parameters for other locations that are within a field of view of an AR device at a given location for which the visualization is rendered (e.g., locations which are visible from a current perspective). For instance, a richer vector field may be provided which includes not only the vectors for wireless channel parameters as measured from the given location, but also for other visible locations. In one example, the perspective or viewport of the AR device may be changed (e.g., yaw, pitch, roll, locational movement, etc.) and a new or updated visualization of wireless channel parameters may be generated and displayed accordingly.

In addition, in one example, a user may select to have different wireless channel parameters displayed via an AR device. For instance, the user may first experience an environment via the AR device by having visualization(s) of one or more received signal strength (RSS) measurements presented. The user may then select to have visualization(s) of one or more RMS delay spread measurements presented. In one example, multiple types of measurements may be included in a visualization to comprise a combined overlay. In such an example, different colors may be used to indicate vectors of different types (e.g., blue for RSS measurements and red for RMS delay spread measurements, or the like), different thicknesses of vectors may be used to indicate measurements of different types (e.g., where magnitudes may be indicated by vector/segment length), and so on. These and other aspects of the present disclosure are discussed in greater detail below in connection with the examples of FIGS. 1-5.

Figure 1:
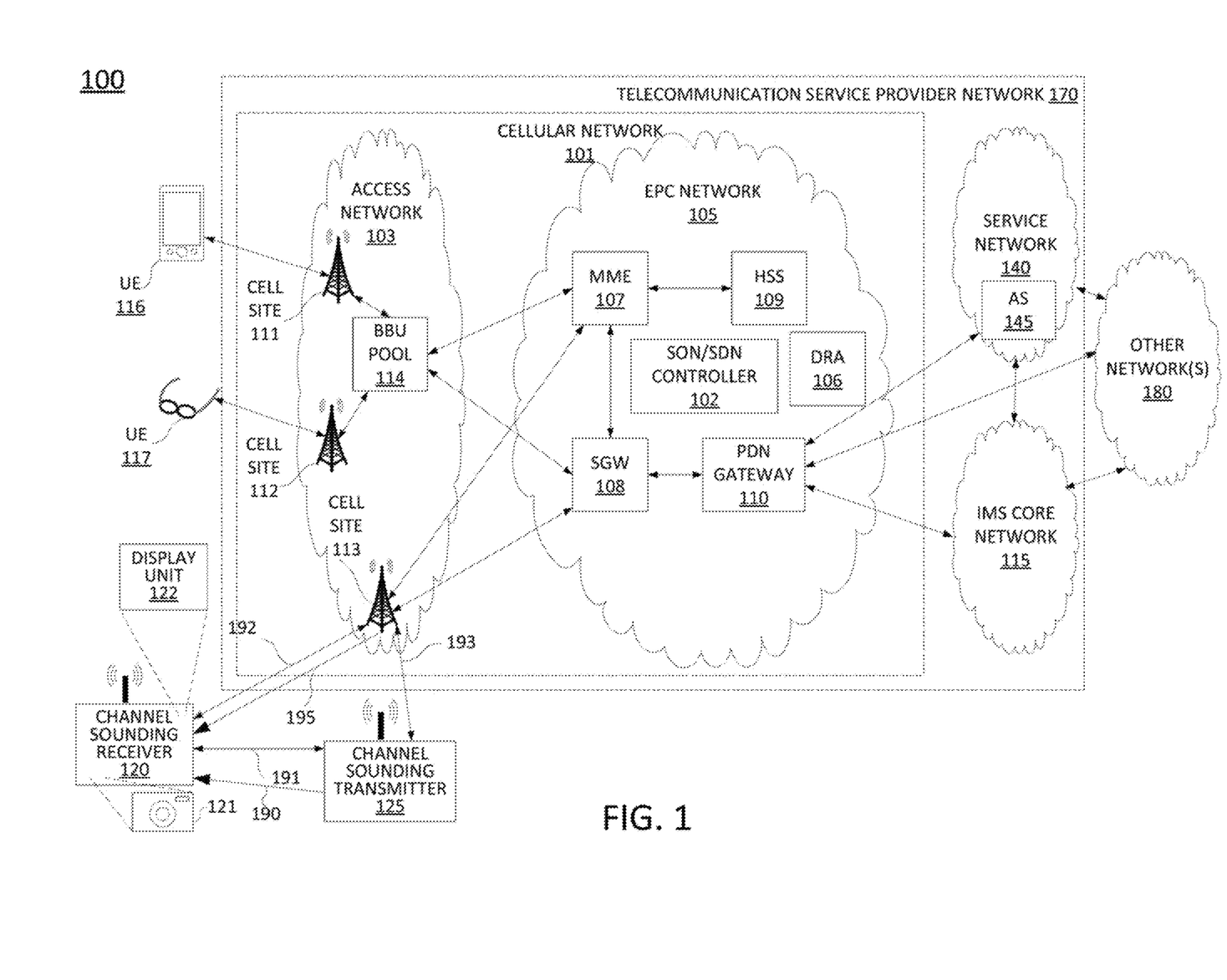
FIG. 1 illustrates an example system, in accordance with the present disclosure.

To better understand the present disclosure, FIG. 1 illustrates an example network, or system 100 in which examples of the present disclosure for presenting a visualization of at least one wireless channel parameter as an overlay on top of an image of an environment may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device"). In accordance with the present disclosure, either or both of UE 116 and UE 117 may comprise AR devices. For example, UE 117 may a wearable computing device (e.g., smart glasses, an AR and/or VR headset, or the like). Similarly, UE 116 may comprise a mobile computing device, such as a smartphone, a tablet, or the like with a 2D display screen. In one example, UE 116 may also include a camera to capture imagery of the environment. Either or both of UE 116 and UE 117 may be used to render and/or to present visualizations of wireless channel parameters as described herein.

In one example, the cellular network 101 comprises an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of cell sites 111-113 may comprise a 5G "new radio" (NR) base station.

In one example, the channel sounding receiver 120 and the channel sounding transmitter 125 may be used to measure wireless channel parameters (broadly, "channel sounding"). In one example, channel sounding receiver 120 may comprise a user equipment, e.g., a mobile endpoint device comprising a cellular telephone, a smartphone, a tablet computing device, a laptop computer, or any other cellular-capable mobile telephony and computing. In one example, channel sounding receiver 120 may comprise a dedicated channel sounding device. Similarly, the channel sounding transmitter 125 may comprise a dedicated channel sounding device.

In one example, the channel sounding transmitter 125 may comprise a switched antenna array with transmitting antennas having different orientations, e.g., a curved array. For instance, in one example, a switched antenna array to transmit wireless test signals may have seven transmitting antennas, each antenna oriented to cover 18.5 degrees of azimuth at half-power beamwidth, which may cover a total of 120 degrees in azimuth (with a small overlap in beamwidth for adjacent antennas in the array). In one example, the channel sounding transmitter 125 may comprise one or more phased antenna arrays (e.g., a quantity of M phased arrays), M RF front ends, and 1-M digital baseband units. In one example, the channel sounding transmitter 125 may transmit channel sounding signals (also referred to as "channel sounding waveforms") for reception and measurement of wireless channel parameters by the channel sounding receiver 120. In general, the channel sounding waveforms may have a variety of characteristics, such as those described above, that may be specified by the channel sounding transmitter 125 (and/or by an operator thereof).

In one example, the channel sounding receiver 120 may be used to receive channel sounding waveforms that are transmitted in an environment from the channel sounding transmitter 125, where the channel sounding waveforms, as received, may be used to calculate or determine the measures of various wireless channel parameters such as: a complex impulse response, a path loss, an RSS, a CIR, an excess delay, an RMS delay spread, an angular spread, a Doppler spread, a fade rate, an AoA, and so forth. For illustrative purposes, the "wireless channel(s)" for which the channel sounding receiver 120 is obtaining channel sounding waveforms and measuring wireless channel parameters may be indicated by reference numeral 190 in FIG. 1.

In one example, the channel sounding receiver 120 includes a plurality of phased array antennas that may be activated and deactivated according to a schedule or otherwise synchronized to the transmission of channel sounding waveforms. In one example, each phased array antenna may be paired with an RF front end to receive radio frequency (RF) signals from the respective phased array antenna and convert the signals into baseband signals. A digital sampling unit (e.g., an analog-to-digital converter (ADC) of a baseband processing unit) may convert the baseband signals into digital representations of the channel sounding waveforms that are received via the respective phased array antennas. For instance, the digital sampling units may oversample the analog baseband signals at a sampling interval under the control of timing signals from a clock circuit to create the digital representations of the channel sounding waveforms. In one example, each phased array may cover 90-120 degrees in azimuth, 90-180 degrees in elevation, etc., and the phased arrays may collectively cover 360 degrees in azimuth and 180 degrees in elevation (or greater, e.g., to account for angles below horizon).

In one example, the baseband processing units may output the digital representations of the channel sounding waveforms to a processor unit that is configured to perform various operations for determining measures of wireless channel parameters, as described herein. For instance, the channel sounding receiver 120 may calculate, based upon the digital representations of the channel sounding waveforms, a phase difference between channel sounding waveforms received via respective antennas. The processor unit may further determine an angle of arrival (AoA) based upon the antenna positions and the phase difference.

In one example, the channel sounding receiver 120 may receive a reference copy or copies of the channel sounding waveforms(s) and/or a set of parameters characterizing the channel sounding waveforms, from the channel sounding transmitter 125. Accordingly, the channel sounding receiver 120 may determine a carrier-to-interference ratio (CIR) by comparing a sequence received via one of the phased array antennas with a reference copy. Similarly, the channel sounding receiver 120 may calculate a complex impulse response, a path loss, an RSS, a CIR, an excess delay, an RMS delay spread, an angular spread, a Doppler spread, a fade rate, an AoA, or the like, from the digital representations of the channel sounding waveforms.

In one example, the channel sounding transmitter 125 and the channel sounding receiver 120 may establish a wireless side link for exchanging timing information (broadly, a synchronization signal) as well as for conveying information regarding the channel sounding waveform (e.g., a reference copy and/or modulation parameters, beam information, etc.). To illustrate, a wireless side link may include a communication session via cellular network infrastructure, e.g., including at least wireless links 192 and 193. Alternatively, the wireless side link may comprise a wireless communication session via a non-cellular wireless networking protocol, such as IEEE 802.11/Wi-Fi, or the like, or via a wireless communication session in accordance with a set of non-restricted frequency resources (e.g., using ISM band frequencies). In such examples, the non-cellular wireless communication session may include an access point (AP) coordinator (not shown) and/or a peer-to-peer session (represented by wireless link 191 in FIG. 1).

In one example, the channel sounding receiver 120 may perform other functions, in addition to channel sounding, in accordance with the present disclosure. For instance, as illustrated in FIG. 1, the channel sounding receiver 120 may also include a camera 121, which may be used to capture imagery of the environment around the channel sounding receiver 120, where the imagery may be associated with measurements of wireless channel parameters at one or more locations. In one example, the camera 121 may comprise a 360 degree camera, or an omnidirectional camera. The imagery of the environment may be stored at the channel sounding receiver 120 and/or provided to channel sounding transmitter 125 and/or another device, such as 145.

In one example, the channel sounding receiver 120 may also include a display unit 122. For instance, the channel sounding receiver 120 may also be used to generate and display visualizations of wireless channel parameters, which may be presented as additional visual information overlaid on imagery of the environment. In one example, the display unit 122 may comprise a display screen which may present the visualization(s) of wireless channel parameter(s) over imagery of the environment which may be captured from camera 121. In another example, the display unit 122 may comprise AR glasses, in which case the presenting of the visualization(s) of the wireless channel parameter(s) may comprise a semi-transparent projection via AR glasses, e.g., using projector(s) and mirror(s), where the imagery of the environment comprises the outward view of the user via the AR glasses.

In one example, the channel sounding receiver 120 and channel sounding transmitter 125 may each comprise all or a portion of a computing device or system, such as computing system 500, and/or processing system 502 as described in connection with FIG. 5 below, and may be configured to provide one or more functions for presenting a visualization of at least one wireless channel parameter as an overlay on top of an image of an environment, and for performing various other operations in accordance with the present disclosure.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, personnel of an operator of the telecommunication service provider network 170, and/or other users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more functions for presenting a visualization of at least one wireless channel parameter as an overlay on top of an image of an environment in accordance with the present disclosure. For instance, channel sounding receiver 120 and/or channel sounding transmitter 125 may forward measurements of wireless channel parameters from channel sounding receiver 120 to AS 145 for storage. Either or both of channel sounding receiver 120 and channel sounding transmitter 125 may also forward additional data to AS 145 for storage, such as reference copies of the channel sounding waveform(s) and/or parameters thereof, transmit beam information, time stamp information, location information of the channel sounding receiver 120 and channel sounding transmitter 125, imagery of the environment at various locations, and so forth.

In one example AS 145 may generate the one or more visualizations of wireless channel parameters and may provide the one or more visualizations to an AR device for presentation. Alternatively, or in addition, AS 145 may provide wireless channel parameters to one or more AR devices, which may then generate and present visualization(s) of the wireless channel parameter(s) associated with respective locations in a physical environment, or in a virtual environment that is representative of the physical environment from which the measurements of the wireless channel parameters are obtained. For instance, UE 117 may be in communication with AS 145 via telecommunication service provider network 170 and may indicate a location of the UE 117. In one example, UE 117 may also indicate a desired wireless channel parameter (e.g., received signal strength). AS 145 may then generate a visualization of the wireless channel parameters for the location and transmit the visualization to UE 117. UE 117 may then render and display the visualization as a transparent overlay projected over a current view of a user.

As another example, UE 116 may be in communication with AS 145 via telecommunication service provider network 170 and may indicate a location of the UE 116 in a virtual environment that is representative of a physical environment. In one example, UE 116 may also indicate a desired wireless channel parameter (e.g., received signal strength). AS 145 may then generate a visualization of the wireless channel parameters for the location. In addition, AS 145 may also retrieve imagery of the environment that is associated with the location, and may transmit both the visualization and the imagery of the environment to UE 116. Accordingly, UE 116 may overlay the visualization on top of the imagery of the environment, and may present the combination via a display screen. Thus, although UE 116 may be physically present at or near the location(s) from which the wireless channel parameters are measured, UE 116 may also be at an entirely remote location, where a user may visually experience the wireless channel in virtual reality.

Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 102.

In one example, SON/SDN controller 102 may function as a self-optimizing network (SON) orchestrator that is responsible for activating and deactivating, allocating and deallocating, and otherwise managing a variety of network components. In one example, SON/SDN controller 102 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, channel sounding may utilize multiple channel sounding receivers to receive channel sounding signals/waveforms from channel sounding transmitter 125. Similarly, multiple mobile channel sounding transmitters may be utilized for channel sounding in conjunction with channel sounding receiver 120 and/or multiple channel sounding receivers.

The above examples are described in connection with a channel sounding system comprising channel sounding receiver 120 and channel sounding transmitter 125. However, in another example, the wireless channel parameters may be measured in connection with channel sounding via a base station, e.g., cell site 112. In other words, cell site 112 may comprise the channel sounding transmitter, where the "wireless channel(s)" for which the channel sounding receiver 120 is obtaining channel sounding waveforms and measuring wireless channel parameters may be indicated by reference numeral 195 in FIG. 1. Similarly, examples are described above where UE 116 and UE 117 obtain wireless channel parameters and/or visualizations of wireless channel parameters from AS 145. However, in other examples, UE 116 and/or UE 117 may alternatively or additionally obtain wireless channel parameters and/or visualizations of wireless channel parameters (as well as imagery of the environment, in some cases) from channel sounding receiver 120 and/or from channel sounding transmitter 125. For example, UE 116 and/or UE 117 may communicate with channel sounding receiver 120 and/or channel sounding transmitter 125 via cellular network 101 and/or in accordance with a non-cellular wireless networking protocol, such as a wireless local area network protocol (e.g., IEEE 802.11, or the like), or a wireless peer-to-peer protocol (e.g., IEEE 802.15).

In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 102 may be spilt into separate components to operate as a SON orchestrator and a SDN controller, respectively. Similarly, although the SON/SDN controller 102 is illustrated as a component of EPC network 105, in another example SON/SDN controller 102, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 145 of FIG. 1 may represent an application function (AF) for adjusting aspects of a cellular network in response to measurements of wireless channel parameters by a receiver device, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
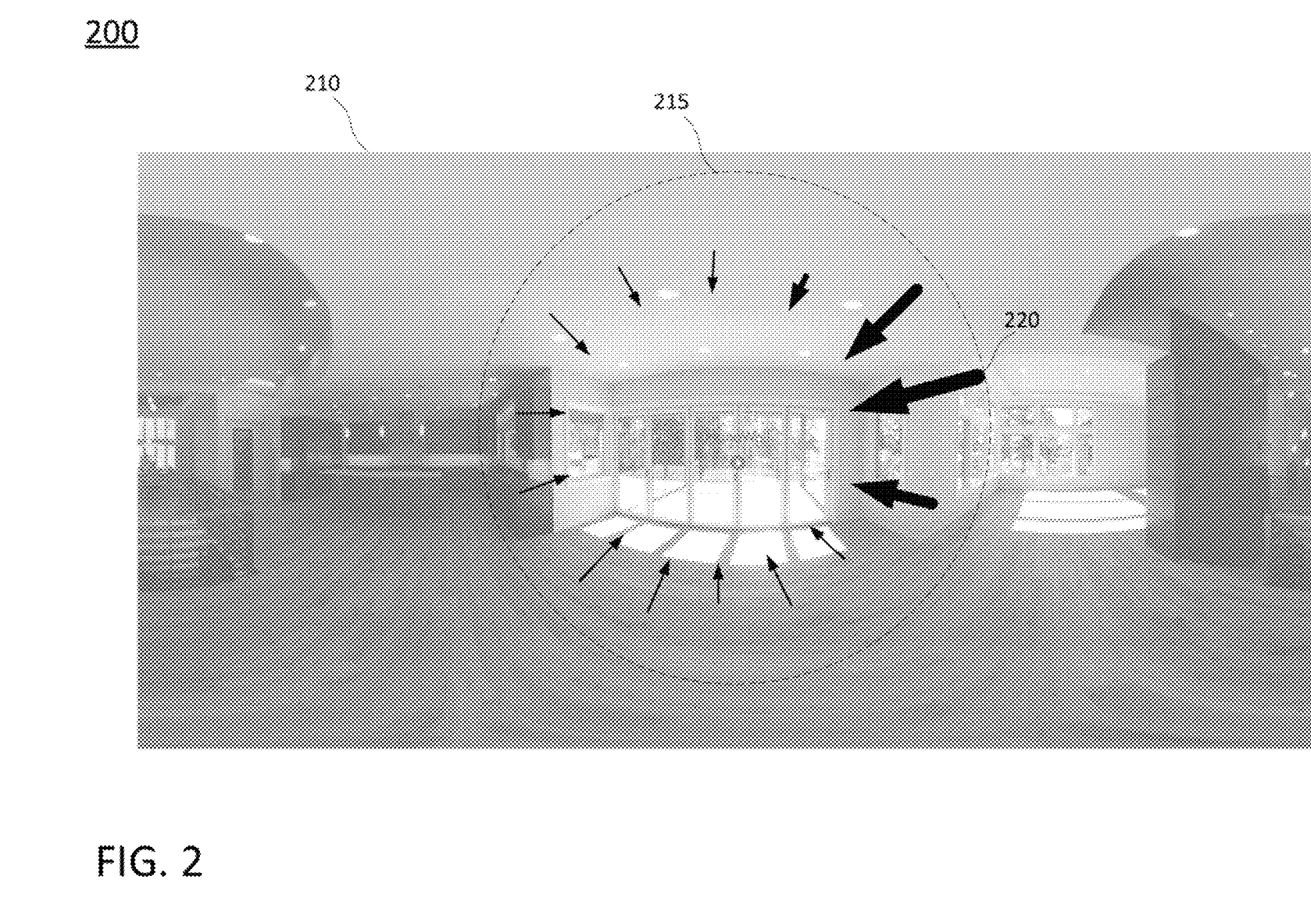
FIG. 2 illustrates an example visualization of wireless channel parameters as an overlay on top of an image of an environment, in accordance with the present disclosure.

FIG. 2 illustrates a first example 200 of a presentation of a visualization 215 of at least one wireless channel parameter as an overlay on top of an image 210 of an environment. In one example, the image 210 of the environment may be presented via a display screen and may be overlaid with the visualization 215. In another example, the visualization 215 may comprise a projection (e.g., a semi-transparent projection) using projector(s) and mirror(s) via AR glasses, where the image 210 of the environment comprises the outward view of the user via the AR glasses.

As described above, the visualization 215 may comprise one or more vectors representing one wireless channel parameters. For instance, vectors may be generated and presented such that the vectors appear to be pointing toward or away from a location of an AR device (e.g., at a current location in the physical environment, and/or from a perspective within a virtual environment comprising the image 210 that is representative of the physical environment). For example, the wireless channel parameters may be represented as line segments (in this case arrows) having lengths and/or thicknesses which are representative of magnitudes of the respective wireless channel parameters. The AR device may comprise a channel sounding receiver, where the visualization 215 may include vectors representing current measurements of wireless channel parameters. In another example, the AR device may be moved throughout the environment (virtually or physically), where the visualization 215 may be rendered for a given location and orientation (viewport) from previously measured wireless channel parameters.

As illustrated in FIG. 2, each vector, or line segment, may also have a direction that is indicative of an angle of arrival (AoA) (or angle of departure (AoD) for visualizations of the wireless channel from a transmitter perspective and/or for with respect to an uplink from the perspective of a channel sounding receiver to a channel sounding transmitter). The directions of arrival and/or departure, and the magnitudes may allow a user, such as network technician, to identify locations of interest. For instance, vector 220 is the largest vector and may indicate the AoA associated with the greatest received signal strength (RSS). The technician may also see that this corresponds to a physical feature of the environment. For instance, vector 220 appears to be aligned with a hallway extending toward a row of windows. This may be in general direction of a channel sounding transmitter and appears to show an area where there may be little interference with the channel sounding signals (e.g., no thick walls, only glass/windows, etc.). Although a row of glass doors appears straight ahead in the image 210, the RSS from this direction may still be less than from the direction of vector 220. Thus, these and other useful observations may be made by a technician via the visualizations enabled by the example 200.

Figure 3:
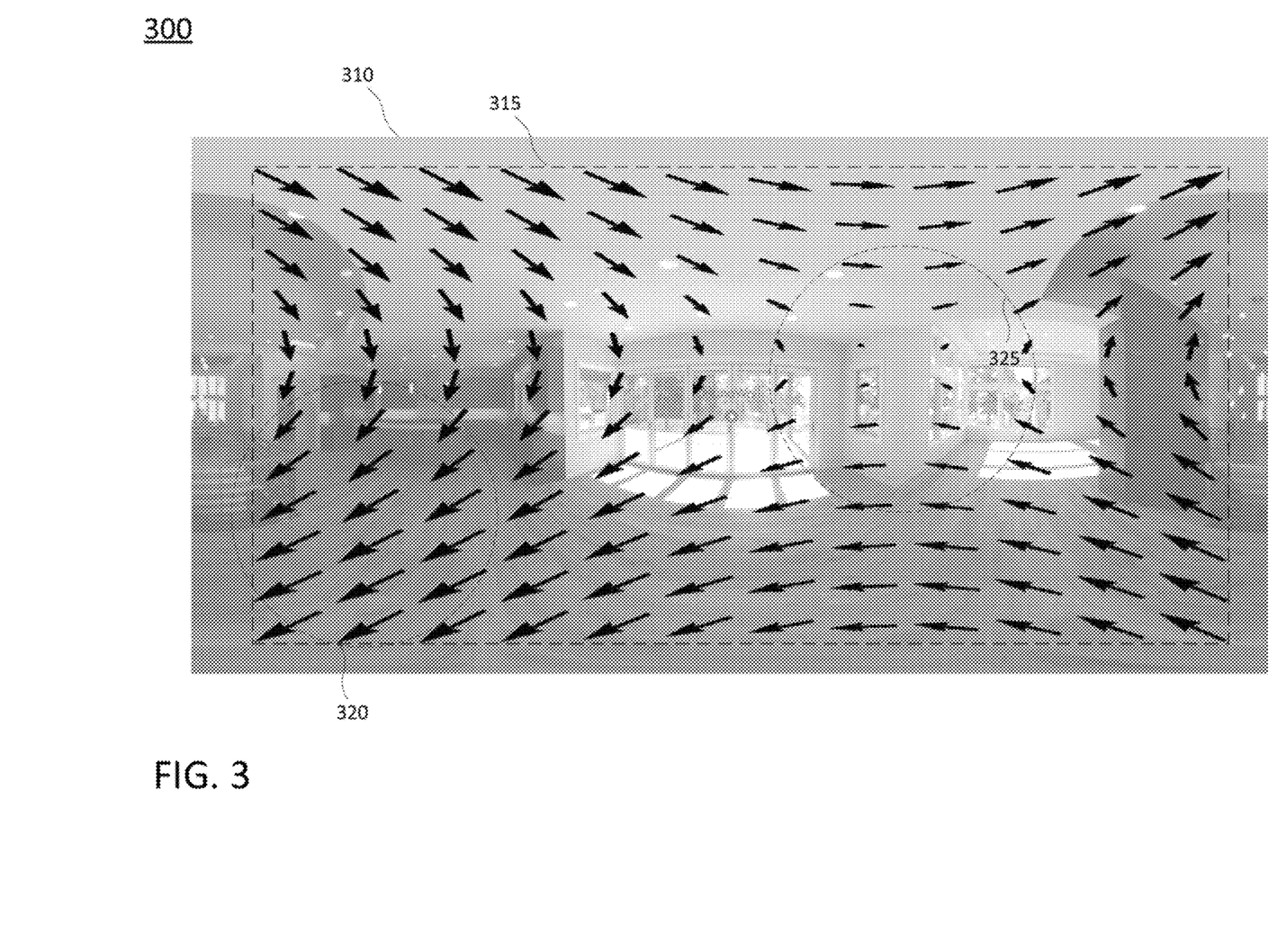
FIG. 3 illustrates an additional example visualization of wireless channel parameters as an overlay on top of an image of an environment, in accordance with the present disclosure.

FIG. 3 illustrates an additional example 300 of a presentation of a visualization 315 of at least one wireless channel parameter as an overlay on top of an image 310 of an environment. In one example, the image 310 of the environment may be presented via a display screen and may be overlaid with the visualization 315. In another example, the visualization 315 may comprise a projection (e.g., a semi-transparent projection) using projector(s) and mirror(s) via AR glasses, where the image 310 of the environment comprises the outward view of the user via the AR glasses.

For illustrative purposes, the image 310 is the same as image 210 of the example 200 of FIG. 2. However, in the example 300, the visualization 315 may include vectors representing one or more wireless channel parameters for other locations that are within a field of view at the given location for which the visualization 315 is rendered (e.g., locations which are visible from the current perspective as shown in image 210). For instance, a richer vector field may be provided which includes not only the vectors for wireless channel parameters as measured from the given location, but also for other visible locations. Similar to the example 200, the magnitudes of the wireless channel parameters may be indicated by thickness and/or segment length. However, it should be understood that in other examples, magnitude may be indicated by colors according to a designated color scheme, by line segment/vector density, and so on. Thus, for instance, it can be seen (e.g., by a technician) in the example 300 that region 320 comprises an area where the wireless channel parameters (e.g., received signal strengths (RSSs)) have greater magnitude as compared to region 325. Other useful observations may be made by a technician via the visualizations enabled by the example 300. For instance, it may be seen that AoA appears to be from left to right (facing the page) near the top of the room visible in image 310, and right to left bear the bottom of the room visible in the image 310. If the technician is considering deployment of a customer premises equipment (CPE), for example, the antenna/receiver orientation may be optimally arranged depending upon the height at which the CPE will be deployed (e.g., pointing toward the right (with respect to facing the page) if deployed near the ground versus pointing towards the left if deployed closer to the ceiling).

Figure 4:
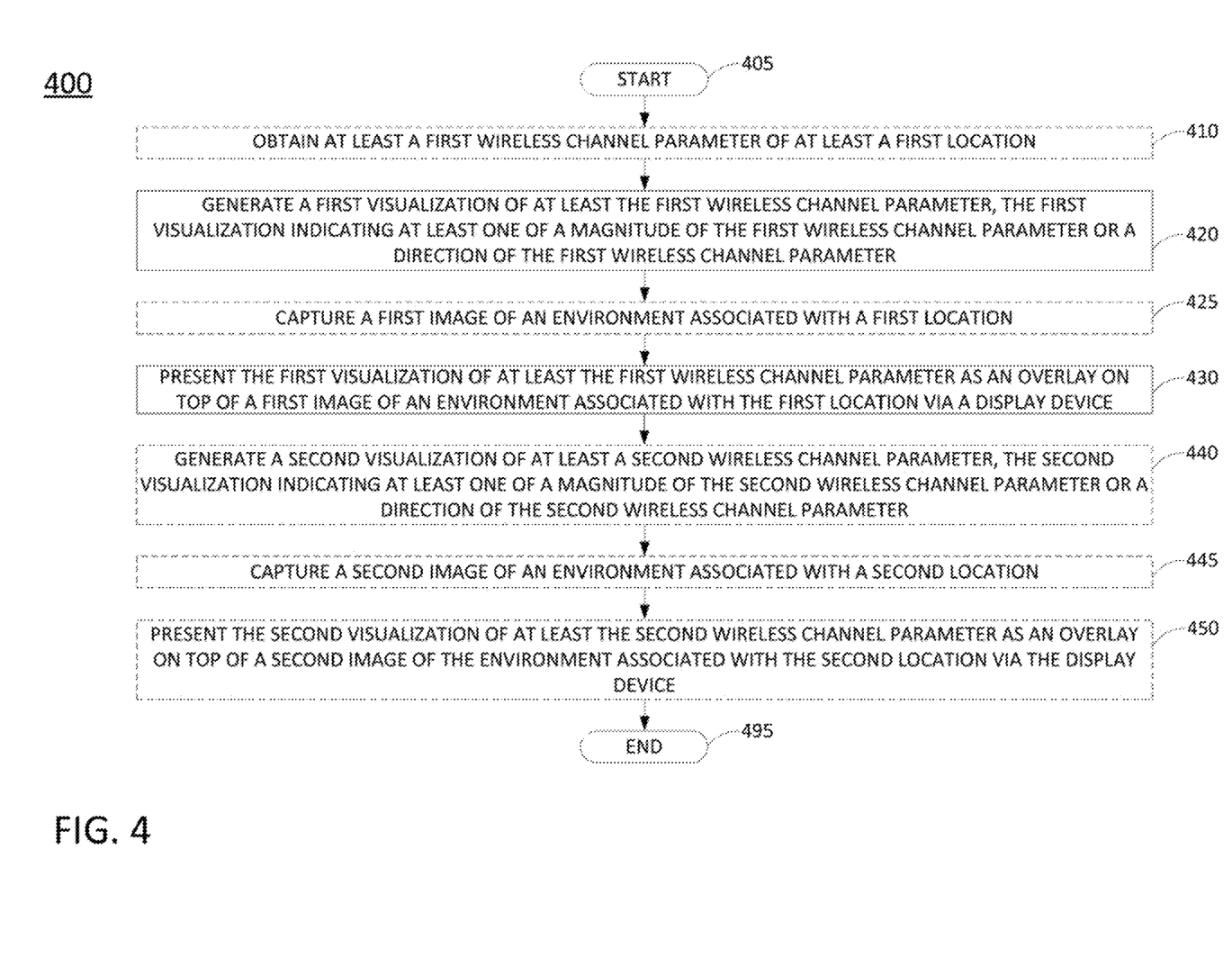
FIG. 4 illustrates a flowchart of an example method for presenting a visualization of at least one wireless channel parameter as an overlay on top of an image of an environment.

FIG. 4 illustrates a flowchart of an example method 400 for presenting a visualization of at least one wireless channel parameter as an overlay on top of an image of an environment, in accordance with the present disclosure. In one example, steps, functions, and/or operations of the method 400 may be performed by a device as illustrated in FIG. 1, e.g., a channel sounding receiver, a channel sounding transmitter, a user equipment or AR device, a server, or any one or more components thereof, such as a processing system, one or more transceivers, one or more antennas or antenna arrays (e.g., a phased array antenna), a GPS unit, and so forth. In accordance with the present disclosure a processing system may include one or more processors, which can include CPUs, programmable logic devices (PLDs), application specific integrated circuits (ASICs), or the like, or a combination thereof. For instance, a processing system may include central processing unit, a digital baseband unit, and so forth. In one example, the steps, functions, or operations of method 400 may be performed by a plurality of such devices in conjunction with one another. In one example, the steps, functions, or operations of method 400 may be performed by a computing device or system 500, and/or processor 502 as described in connection with FIG. 5 below. For instance, the computing device or system 500 may represent any one or more components of one or more components of the system 100 of FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and may proceed to step 410.

At step 410, the processing system obtains at least a first wireless channel parameter of at least a first location. In one example, at least the first wireless channel parameter of at least the first location comprises a plurality of wireless channel parameters of at least the first location, where the plurality of wireless channel parameters indicates a plurality of different directions of the plurality of wireless channel parameters. In one example, the plurality of wireless channel parameters of at least the first location comprises a plurality of wireless channel parameters of a plurality of locations. In addition, the plurality of wireless channel parameters may further indicate a plurality of different magnitudes of the plurality of wireless channel parameters. The plurality of wireless channel parameters may comprise one or more KPIs, such as a complex impulse response, a path loss, a received signal strength (RSS), e.g., a reference signal received power (RSRP), a carrier-to-interference (CIR) ratio (or signal-to-noise ratio (SNR)), an excess delay, a root-mean-square (RMS) delay spread, an angular spread, a Doppler spread, a fade rate, an angle of arrival (AoA), an angle of departure (AoD), or the like.

In one example, the processing system comprises a channel sounding receiver. In such case, step 410 may comprise obtaining at least a first channel sounding waveform from a channel sounding transmitter and calculating at least the first wireless channel parameter in accordance with at least the first channel sounding waveform. Step 410 may further include obtaining channel sounding waveforms and calculating wireless channel parameters at a first location, at a second location, and so forth. In another example, the obtaining of at least the first wireless channel parameter of at least the first location may comprise retrieving at least the first wireless channel parameter (and in some examples, one or more additional parameters) from a server, from a memory or storage unit of the processing system, from a channel sounding receiver and/or from a channel sounding transmitter, and so forth.

At step 420, the processing system generates a first visualization of at least the first wireless channel parameter, where the visualization indicates at least one of: a magnitude of the first wireless channel parameter or a direction of the first wireless channel parameter. For instance, the plurality of wireless channel parameters may indicate a plurality of different directions of the plurality of wireless channel parameters. In addition, the plurality of wireless channel parameters may indicate a plurality of different magnitudes of the plurality of wireless channel parameters. To illustrate, for each wireless channel parameter of the plurality of wireless channel parameters, a magnitude and a direction are indicated in the first visualization by a linear segment aligned in the direction. In one example, a thickness of the linear segment may correspond to the magnitude of the respective wireless channel parameter. In another example, a length of the linear segment may correspond to the magnitude of the respective wireless channel parameter. In still another example, a color of the linear segment may correspond to the magnitude of the respective wireless channel parameter according to a designated color scale (e.g., red is greater in magnitude, yellow is of a median magnitude, blue is lesser in magnitude, etc.). In one example, a combination of any of the foregoing types of indicators may be used, e.g., thickness and length both corresponding to the magnitude of the respective wireless channel parameter.

As mentioned above in connection with step 410, in one example, the plurality of wireless channel parameters of at least the first location comprises a plurality of wireless channel parameters of a plurality of locations. In such an example, the first visualization may indicate the plurality of different directions of the plurality of wireless channel parameters from the plurality of locations (e.g., the plurality of locations being within a field of view of a display device via which the first visualization is to be presented). In one example, the first visualization comprises a vector field that includes at least a first vector that indicates the direction of at least the first wireless channel parameter. In one example, the first vector further indicates the magnitude of the first wireless channel parameter. In one example, the first visualization may include an indication of an estimation of a wireless channel parameter based upon an interpolation between the first wireless channel parameter and at least a second wireless channel parameter of the plurality of wireless channel parameters.

At optional step 425, the processing system may capture a first image of an environment associated with a first location (e.g., captured at the first location). For instance, the processing system may include a digital camera (e.g., a 360 degree camera, an omnidirectional camera, or the like) which may capture the first image at the first location at a same time or a different time as the obtaining of at least the first wireless channel parameter of at least the first location of step 410.

At step 430, the processing system presents the first visualization of at least the first wireless channel parameter as an overlay on top of a first image of an environment associated with the first location via a display device. For instance, the first visualization may be of any form as described above, e.g., line segments/vectors having magnitudes and/or directions as indicated. In one example, the overlay on top of the first image may be similar to the example 200 of FIG. 2 or the example 300 of FIG. 3.

In one example, the display device comprises an augmented reality device. Alternatively, or in addition, in one example, the display device may comprise a virtual reality device. In one example, the display device is present at the first location at a time of the presenting the first visualization. In addition, in one example, the processing system may comprise the display device. The first image of the environment may be obtained via optional step 425 or may be obtained in another way, such as via a separate camera and/or image capture device, from a server storing the first image (and which may be captured via another device), and so on.

At optional step 440, the processing system may generate a second visualization of at least the second wireless channel parameter, where the second visualization indicates at least one of: a magnitude of the second wireless channel parameter or a direction of the second wireless channel parameter. For example, as mentioned above, the plurality of wireless channel parameters of at least the first location may comprise a plurality of wireless channel parameters of a plurality of locations (e.g., including at least a second location). Thus, step 440 may relate to a second visualization associated with a second location and with respect to at least a second wireless channel parameter of the second location. In one example, optional step 440 may comprise the same or similar operations as described above in connection with step 420.

At optional step 445, the processing system may capture a second image of the environment associated with a second location (e.g., captured at the second location). For instance, optional step 445 may comprise the same or similar operations as described above in connection with optional step 225.

At optional step 450, the processing system may present the second visualization of at least the second wireless channel parameter as an overlay on top of a second image of an environment associated with the second location via the display device. For instance, optional step 450 may comprise the same or similar operations as described above in connection with step 430. In one example, the generating the second visualization of optional step 440 and the presenting the second visualization of optional step 450 (and in some instances, the capturing of the second image of optional step 445) are performed in response to a movement of the display device from the first location to the second location. In another example, the generating the second visualization and the presenting the second visualization are performed in response to an input indicating a movement of a field of view of the display device from the first location to the second location (e.g., where the display device comprises a VR device that may not be physically present at the second location).

Following step 430 or any of the optional steps 440-450, the method 400 may proceed to step 495 where the method 400 ends.

It should be noted that the method 400 may be expanded to include additional steps, or may be modified to replace steps with different steps, to combine steps, to omit steps, to perform steps in a different order, and so forth. For example, the method 400 may include repeating one or more steps of the method 400 in connection with additional locations, with respect to different fields-of-view/viewports at the first location or second location, with respect to different wireless channel parameters, and so on. In one example, the capturing of the first image of optional step 425 and the capturing of the second image of step 445, may be performed at or around the same time (e.g., during channel sounding measurements). Similarly, the method 400 is described and illustrated where the wireless channel parameters for the first location and the second location are obtained at step 410. However, in another example, the method 400 may be modified to utilize a different process. For instance, the second wireless channel parameters of the second location may be obtained after step 430 and before step 440. Thus, these and other modifications are all contemplated within the scope of the present disclosure.

In addition, although not specifically specified, one or more steps, functions, or operations of the method 400 may include a storing, displaying, and/or outputting step as required for a particular application. In other words, any data, records, fields, and/or intermediate results discussed in the method(s) can be stored, displayed, and/or outputted either on the device executing the method(s) or to another device, as required for a particular application. Furthermore, steps, blocks, functions or operations in FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

Figure 5:
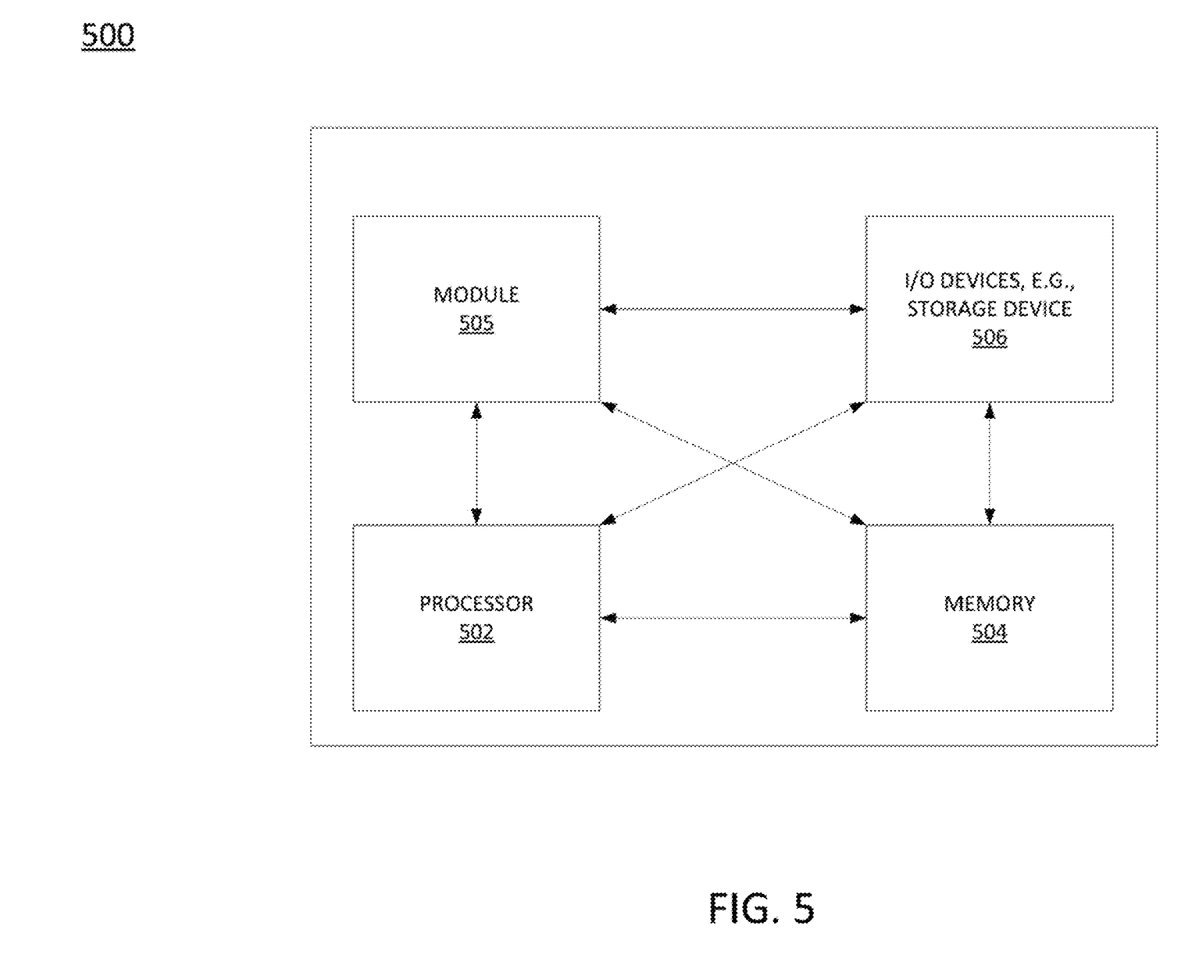
FIG. 5 illustrates an example of a computing device, or computing system, specifically programmed to perform the steps, functions, blocks, and/or operations described herein.

FIG. 5 depicts a high-level block diagram of a computing device or processing system 500 specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for presenting a visualization of at least one wireless channel parameter as an overlay on top of an image of an environment, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, antenna arrays, remote radio heads (RRHs), baseband units (BBUs), transceivers, power units, GPS units, and so forth. Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one example, instructions and data for the present module or process 505 for presenting a visualization of at least one wireless channel parameter as an overlay on top of an image of an environment (e.g., a software program comprising computer-executable instructions) can be loaded into memory 504 and executed by hardware processor element 502 to implement the steps, functions, or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for presenting a visualization of at least one wireless channel parameter as an overlay on top of an image of an environment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    obtaining, by a processing system including at least one processor, at least a first wireless channel parameter of at least a first location, wherein the at least the first wireless channel parameter of at least the first location comprises a plurality of wireless channel parameters of at least the first location, wherein the plurality of wireless channel parameters indicates a plurality of different directions of the plurality of wireless channel parameters;
    generating, by the processing system, a first visualization of the at least the first wireless channel parameter, wherein the first visualization indicates at least one of: a magnitude of the at least the first wireless channel parameter or a direction of the at least the first wireless channel parameter, and wherein the first visualization indicates the plurality of different directions of the plurality of wireless channel parameters; and presenting, by the processing system, the first visualization of the at least the first wireless channel parameter as an overlay on top of a first image of an environment associated with the first location via a display device.

2. The method of claim 1, wherein the display device comprises a virtual reality device.

3. The method of claim 1, wherein the display device comprises an augmented reality device.

4. The method of claim 1, wherein the display device is present at the first location at a time of the presenting the first visualization.

5. The method of claim 1, wherein the plurality of wireless channel parameters further indicates a plurality of different magnitudes of the plurality of wireless channel parameters, wherein the first visualization indicates the plurality of different magnitudes of the plurality of wireless channel parameters.

6. The method of claim 5, wherein a magnitude and a direction for each wireless channel parameter of the plurality of wireless channel parameters are indicated in the first visualization by a linear segment aligned in the direction and a thickness of the linear segment corresponding to the magnitude.

7. The method of claim 5, wherein a magnitude and a direction for each wireless channel parameter of the plurality of wireless channel parameters are indicated in the first visualization by a linear segment aligned in the direction and a length of the linear segment corresponding to the magnitude.

8. The method of claim 5, wherein a magnitude and a direction for each wireless channel parameter of the plurality of wireless channel parameters are indicated in the first visualization by a linear segment aligned in the direction and a color of the linear segment corresponding to the magnitude according to a designated color scale.

9. The method of claim 1, wherein the plurality of wireless channel parameters of at least the first location further comprises a plurality of wireless channel parameters of a plurality of locations, wherein the first visualization indicates the plurality of different directions of the plurality of wireless channel parameters of the plurality of locations, wherein the plurality of locations is within a field of view of the display device.

10. The method of claim 9, wherein the first visualization comprises an indication of an estimation of a wireless channel parameter based upon an interpolation between the at least the first wireless channel parameter and at least a second wireless channel parameter of the plurality of wireless channel parameters of the plurality of locations.

11. The method of claim 1, wherein the first visualization comprises a vector field that includes at least a first vector that indicates the direction of the at least the first wireless channel parameter.

12. The method of claim 1, wherein the at least the first location comprises a plurality of locations, wherein the plurality of locations includes a second location, wherein the plurality of wireless channel parameters includes at least a second wireless channel parameter of the second location, the method further comprising:

generating a second visualization of the at least the second wireless channel parameter, wherein the second visualization indicates at least one of a magnitude of the at least the second wireless channel parameter or a direction of the at least the second wireless channel parameter; and presenting the second visualization of the at least the second wireless channel parameter as an overlay on top of a second image of the environment associated with the second location via the display device.

13. The method of claim 12, wherein the generating the second visualization and the presenting the second visualization are performed in response to a movement of the display device from the first location to the second location.

14. The method of claim 12, wherein the generating the second visualization and the presenting the second visualization are performed in response to an input indicating a movement of a field of view of the display device from the first location to the second location.

15. The method of claim 1, wherein the processing system comprises the display device.

16. The method of claim 1, wherein the processing system comprises a channel sounding receiver, and wherein the obtaining the at least the first wireless channel parameter of the at least the first location comprises:

obtaining at least a first channel sounding waveform from a channel sounding transmitter; and calculating the at least the first wireless channel parameter in accordance with the at least the first channel sounding waveform.

17. A non-transitory computer-readable medium storing instructions which, when executed by a processing system including at least one processor, cause the processing system to perform operations, the operations comprising:

obtaining at least a first wireless channel parameter of at least a first location, wherein the at least the first wireless channel parameter of at least the first location comprises a plurality of wireless channel parameters of at least the first location, wherein the plurality of wireless channel parameters indicates a plurality of different directions of the plurality of wireless channel parameters;

generating a first visualization of the at least the first wireless channel parameter, wherein the first visualization indicates at least one of: a magnitude of the at least the first wireless channel parameter or a direction of the at least the first wireless channel parameter, and wherein the first visualization indicates the plurality of different directions of the plurality of wireless channel parameters; and presenting the first visualization of the at least the first wireless channel parameter as an overlay on top of a first image of an environment associated with the first location via a display device.

18. An apparatus comprising:

a processing system including at least one processor; and a computer-readable medium storing instructions which, when executed by the processing system, cause the processing system to perform operations, the operations comprising:

obtaining at least a first wireless channel parameter of at least a first location, wherein the at least the first wireless channel parameter of at least the first location comprises a plurality of wireless channel parameters of at least the first location, wherein the plurality of wireless channel parameters indicates a plurality of different directions of the plurality of wireless channel parameters;

generating a first visualization of the at least the first wireless channel parameter, wherein the first visualization indicates at least one of: a magnitude of the at least the first wireless channel parameter or a direction of the at least the first wireless channel parameter, and wherein the first visualization indicates the plurality of different directions of the plurality of wireless channel parameters; and presenting the first visualization of the at least the first wireless channel parameter as an overlay on top of a first image of an environment associated with the first location via a display device.

19. The apparatus of claim 18, wherein the display device comprises a virtual reality device.

20. The apparatus of claim 18, wherein the display device comprises an augmented reality device.

* * * * *

UNITED STATES PATENT AND TRADEMARK OFFICE
CERTIFICATE OF CORRECTION

PATENT NO. : 11,308,703 B2
APPLICATION NO. : 17/107911
DATED : April 19, 2022
INVENTOR(S) : Aditya Chopra et al.

It is certified that error appears in the above-identified patent and that said Letters Patent is hereby corrected as shown below:

On the Title Page

Item [73] delete "AT&TIntellectual Property I, L.P." and insert --AT&T Intellectual Property I, L.P.--

Signed and Sealed this
Nineteenth Day of July, 2022

Katherine Kelly Vidal
*Director of the United States Patent and Trademark Office*